P. B. DONAHOO.
PIVOT LIGHT.
APPLICATION FILED JULY 10, 1909.
986,966.
Patented Mar. 14, 1911.
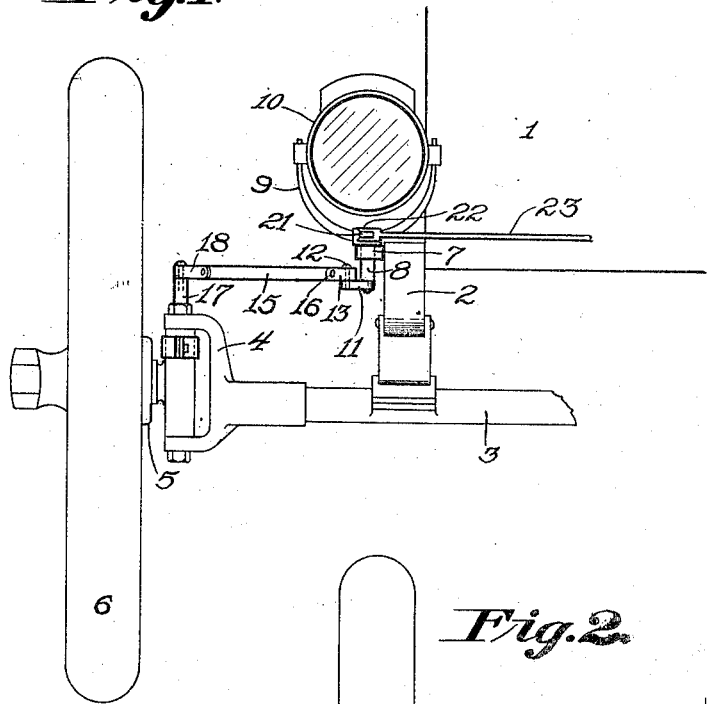
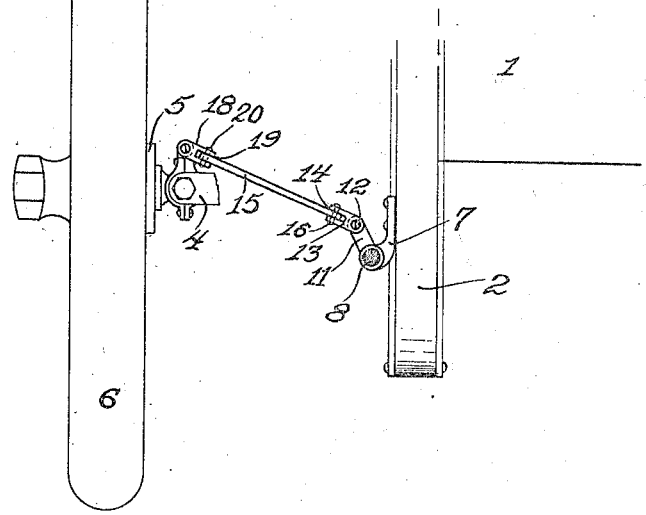
WITNESSES:
J. D. McLaughlin
C. Everett Lancaster
INVENTOR
PETER B. DONAHOO
BY
E. E. Vrooman,
ATTORNEY.

ered, said link 18 having its free end bifurcated,# UNITED STATES PATENT OFFICE.

PETER B. DONAHOO, OF OAKLAND, CALIFORNIA, ASSIGNOR TO ALFRED H. LENT, OF OAKLAND, CALIFORNIA.

PIVOT-LIGHT.

986,966.

Specification of Letters Patent. Patented Mar. 14, 1911.

Application filed July 10, 1909. Serial No. 506,990.

*To all whom it may concern:*

Be it known that I, PETER B. DONAHOO, a citizen of the United States, residing at Oakland, in the county of Alameda and State of California, have invented certain new and useful Improvements in Pivot-Lights, of which the following is a specification, reference being had therein to the accompanying drawing.

This invention relates to headlights for motor and similar vehicles, and the principal object of the same is to provide a mechanism whereby said headlights will be turned with the turning gear of the vehicle so that the light rays will always be projected in the direction in which the vehicle is traveling.

In carrying out the objects of the invention generally stated above, it will, of course, be readily understood that the essential features thereof are necessarily susceptible of changes in details and structural arrangements but a preferred and practical embodiment thereof is shown in the accompanying drawing, wherein—

Figure 1 is a view in front elevation of the forward end of a motor vehicle showing the same equipped with the improved headlight operating mechanism. Fig. 2 is a top plan view, the headlight support being shown in transverse section.

Referring to said drawing by numerals, 1 designates a portion of the usual front, or hood end, of a motor vehicle, 2 the side spring gear which is clipped to the axle 3, said axle having a knuckle joint connection 4 with the hub 5 of a steering wheel 6. The foregoing structure may be of the usual or any convenient type and, hence, a detailed description thereof is thought to be unnecessary.

The spring 2 has the flattened portion of a lamp bracket 7 rigidly secured thereto, the enlarged outwardly projecting end of said bracket having the pivot shaft 8 of the lamp fork 9 mounted therein, said fork carrying a lamp 10. Said pivot shaft 8 projects through the bracket 7, and its lower end is provided with a crank arm 11, the outer end of which carries a pivot pin 12 upon which a link 13 is mounted. The free end of said link 13 is bifurcated, as indicated at 14, for the reception of one end of a connecting rod 15 which may be held therein by means of a bolt 16 or equivalent fastener.

The knuckle joint 4 carries an upstanding pivot pin 17 upon which a link 18 is mounted, said link 18 having its free end bifurcated, as indicated at 19, for the reception of one end of the connecting rod 15, said rod being held in said bifurcated end of the link 18 by means of the bolt or other convenient fastener 20.

As will be understood from the foregoing description, the lamp turning mechanism is located at one side only of the vehicle and has a direct connection with but one lamp. In order, therefore, to operate the lamp at the opposite side of the vehicle simultaneously, the lamp support 7 is provided with a forwardly projecting lip 21 which is engaged by the bifurcated end 22 of a rod 23 extending transversely across the front of the vehicle and having its other end similarly engaged with the support for said opposite lamp.

It will be seen from the foregoing that the turning movement of the steering gear is immediately communicated to the lamps, thereby causing the same to direct their rays of light in the direction in which the vehicle is traveling.

What I claim as my invention is:—

A lamp supporting device comprising a flattened spring with a lamp bracket secured thereto and having an enlarged projecting end, a pivot shaft carried by said end, said pivot shaft projecting through said bracket and having on its lower end a crank arm provided with a pivot pin on its outer end, said pin having a bifurcated link secured thereto, a rod having one end connected to said bifurcated link, and a knuckle joint having an upstanding pin provided with a link having a bifurcated end having the other end of said rod mounted therein.

In testimony whereof I hereunto affix my signature in presence of two witnesses.

PETER B. DONAHOO.

Witnesses:
ALFRED H. LENT,
GEO. E. FISHER.